(12) United States Patent
Yen

(10) Patent No.: US 8,493,673 B2
(45) Date of Patent: *Jul. 23, 2013

(54) LENS MODULE

(75) Inventor: Shih-Chieh Yen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 34 days.

This patent is subject to a terminal disclaimer.

(21) Appl. No.: 13/290,138

(22) Filed: Nov. 7, 2011

(65) Prior Publication Data

US 2013/0027788 A1  Jan. 31, 2013

(30) Foreign Application Priority Data

Jul. 28, 2011  (TW) .................................. 100126829

(51) Int. Cl.
*G02B 7/02* (2006.01)
*G02B 9/60* (2006.01)

(52) U.S. Cl.
USPC .......................................... 359/811; 359/763

(58) Field of Classification Search
USPC ................. 348/340; 359/714, 763, 811, 819, 359/820, 823, 827, 830; 396/529
See application file for complete search history.

(56) References Cited

U.S. PATENT DOCUMENTS

| 4,886,342 | A * | 12/1989 | Kudo et al. | 359/738 |
|---|---|---|---|---|
| 7,530,699 | B2 * | 5/2009 | Shulepova et al. | 359/614 |
| 7,803,291 | B2 * | 9/2010 | Kuwa | 264/1.32 |
| 7,969,668 | B2 * | 6/2011 | Chou | 359/819 |
| 2013/0027787 | A1 * | 1/2013 | Yen | 359/763 |

* cited by examiner

*Primary Examiner* — David N Spector
(74) *Attorney, Agent, or Firm* — Altis Law Group, Inc.

(57) ABSTRACT

A lens module includes a barrel, a first lens, a second lens, and a spacer. The first lens and the second lens are received in the barrel from an object side to an image side of the lens module. Each lens includes an optical portion and a non-optical portion around the optical portion. The spacer is positioned between the non-optical portion of the first lens and the non-optical portion of the second lens. The second lens includes an image-side surface. The non-optical portion on the image-side surface includes a contact portion. The contact portion defines a triangular notch.

10 Claims, 3 Drawing Sheets

LENS MODULE

BACKGROUND

1. Technical Field

The present disclosure relates to a lens module.

2. Description of Related Art

Plastic lenses are less expensive than glass lenses, therefore plastic lenses are popular in lens modules. However, the optical quality of the plastic lenses is worse than that of the glass lenses. Such as, when a light source (such as an electronic light) irradiates the lens module having plastic lenses, the captured image will have many kinds of astigmatism.

Therefore, it is desirable to provide a lens module that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
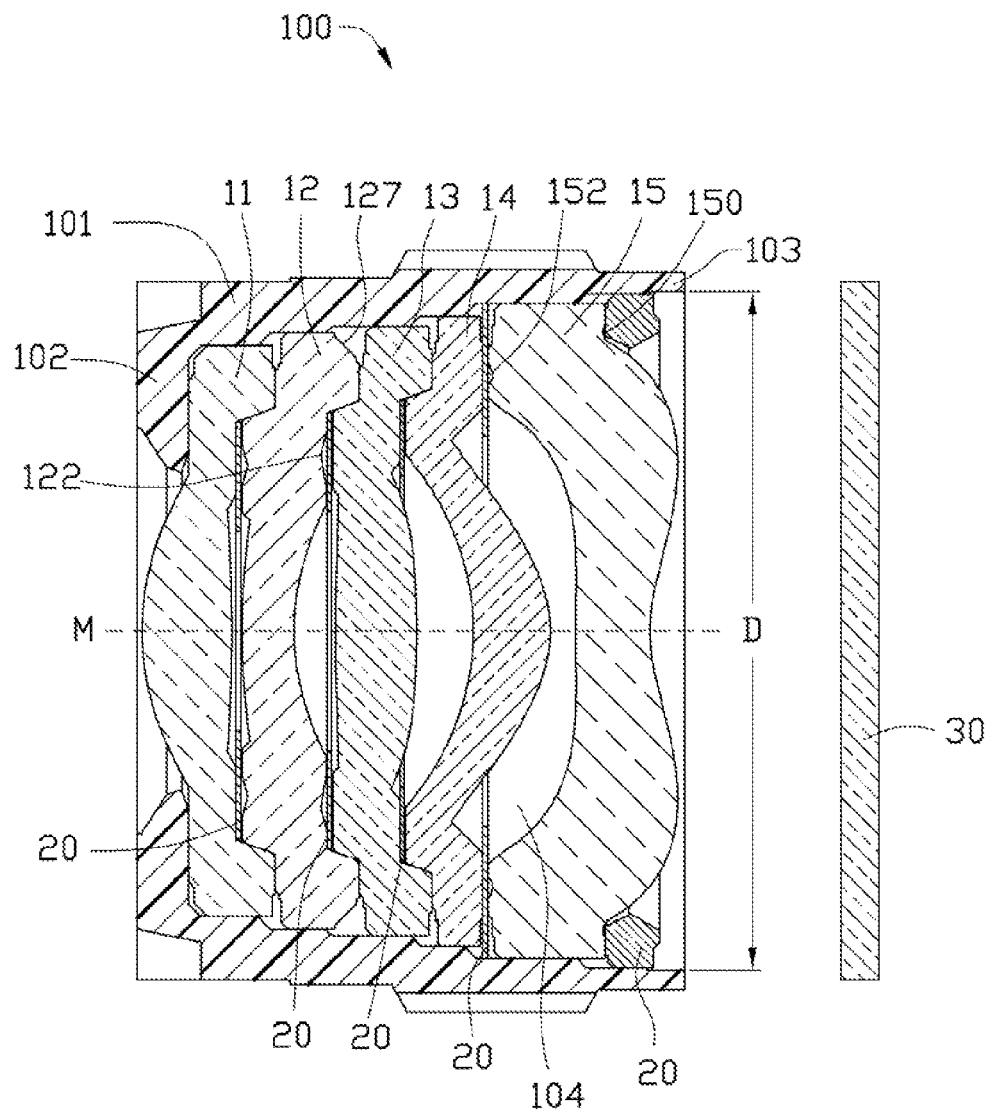
FIG. 1 is a schematic, cross-sectional view of a lens module, according to an exemplary embodiment, the lens module including a first lens, a second lens, a third lens, a fourth lens and a fifth lens.

Referring to FIG. 1, a lens module 100, according to an embodiment, includes a barrel 101, a first lens 11, a second lens 12, a third lens 13, a fourth lens 14, a fifth lens 15, five spacers 20, and an image sensor 30.

The barrel 101 is cylindrical, and includes a semi-enclosed object end 102, an image end 103, and a receiving space 104 communicating between the object end 102 and the image end 103. In one exemplary embodiment, the inner diameter of the image end 103 is D, and D is equal to about 5.3 millimeter (mm).

The five lenses 11-15 are received in the receiving space 104 along an optical axis M of the lens module 100 from the object end 102 to the image end 103. Each of the five lenses 11-15 has an optical portion for imaging and a non-optical portion around the optical portion. Each of the five lenses 11-15 further has an object-side surface facing the object side of the lens module 100 and an image-side surface facing the image side of the lens module 100. When capturing an image, incident light rays enter the lens module 100, transmit through the five lenses 11-15, and reach the image sensor 30.

The five spacers 20 are made of elastic material, and received in the receiving space 104. Four of the five spacers 20 are each interposed between the non-optical portions of two adjacent lenses. The remainder one of the five spacers 20 is positioned on the image-side surface of the fifth lens 15.

Figure 2:
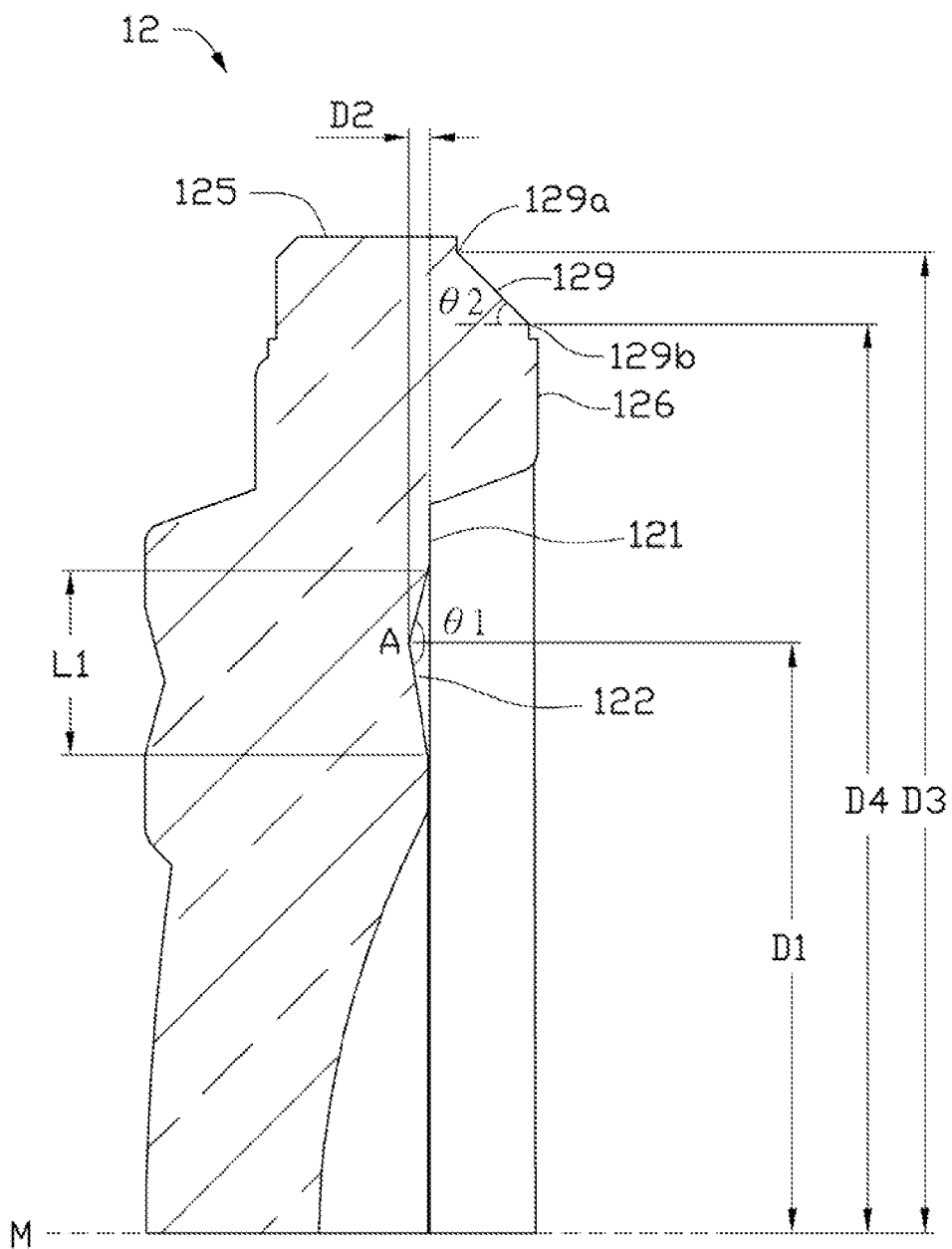
FIG. 2 is a schematic, cross-sectional view of half of the second lens of the lens module of FIG. 1.

Also referring to FIG. 2, the non-optical portion of the second lens 12 includes a first contact portion 121 on the image-side surface of the second lens 12. The first contact portion 121 is adjacent to the optical portion and abuts against the corresponding spacer 20. The first contact portion 121 defines a first notch 122, the first notch 122 has a triangular cross section in a direction parallel to the optical axis M of the lens module 100, the length of the opening of the first notch 122 is L1, 0.2 mm$\leq$L1$\leq$0.5 mm, and thus 0.0377$\leq$L1/D$\leq$0.0943. The first notch 122 surrounds the optical portion of the second lens 12. The first notch 122 has an apex angle $\theta 1$ facing the corresponding spacer 20, 120°$\leq\theta 1\leq$170°. The distance from an apex A of the apex angle $\theta 1$ to the optical axis of the lens module 100 is D1, 1 mm$\leq$D1$\leq$5 mm, and thus 0.189$\leq$D1/D$\leq$0.943. The distance from the apex A to the first contact portion 121 along the optical axis of the lens module 100 is D2, that is, D2 is the depth of the first notch 122, 0.01 mm$\leq$D2$\leq$0.05 mm, and thus 0.002$\leq$D2/D$\leq$0.009. In one exemplary embodiment, L1 is about 0.16 mm, $\theta 1$ is about 124°, D1 is about 1.39 mm, D2 is about 0.05 mm.

The non-optical portion of the second lens 12 includes a second contact portion 125, a third contact portion 126, and a connecting portion 127 connecting the second contact portion 125 and the third contact portion 126. The second contact portion 125, the third contact portion 126, and the connecting portion 127 are on the image-side surface of the second lens 12. The second contact portion 125 abuts against the inner sidewall of the barrel 101. The third contact portion 126 abuts against the third lens 13. The connecting portion 127 has an inclined surface 129. The included angle between the inclined surface 129 and the optical axis of the lens module 100 is $\theta 2$, 100°$\leq\theta 2\leq$160°. The inclined surface 129 has a first end 129a and a second end 129b. The first end 129a is away from the optical axis of the lens module 100 in relative to the second end 129b. The distance between the first end 129a and the optical axis of the lens module 100 is D3, 2 mm$\leq$D3$\leq$2.5 mm, and thus 0.377$\leq$D3/D$\leq$0.472. The distance between the second end 129b and the optical axis of the lens module 100 is D4, 1.8 mm$\leq$D4$\leq$2.4 mm, and thus 0.339$\leq$D4/D$\leq$0.453. In one exemplary embodiment, $\theta 2$ is about 135°, D3 is about 2.32 mm, D4 is about 2.15 mm.

Figure 3:
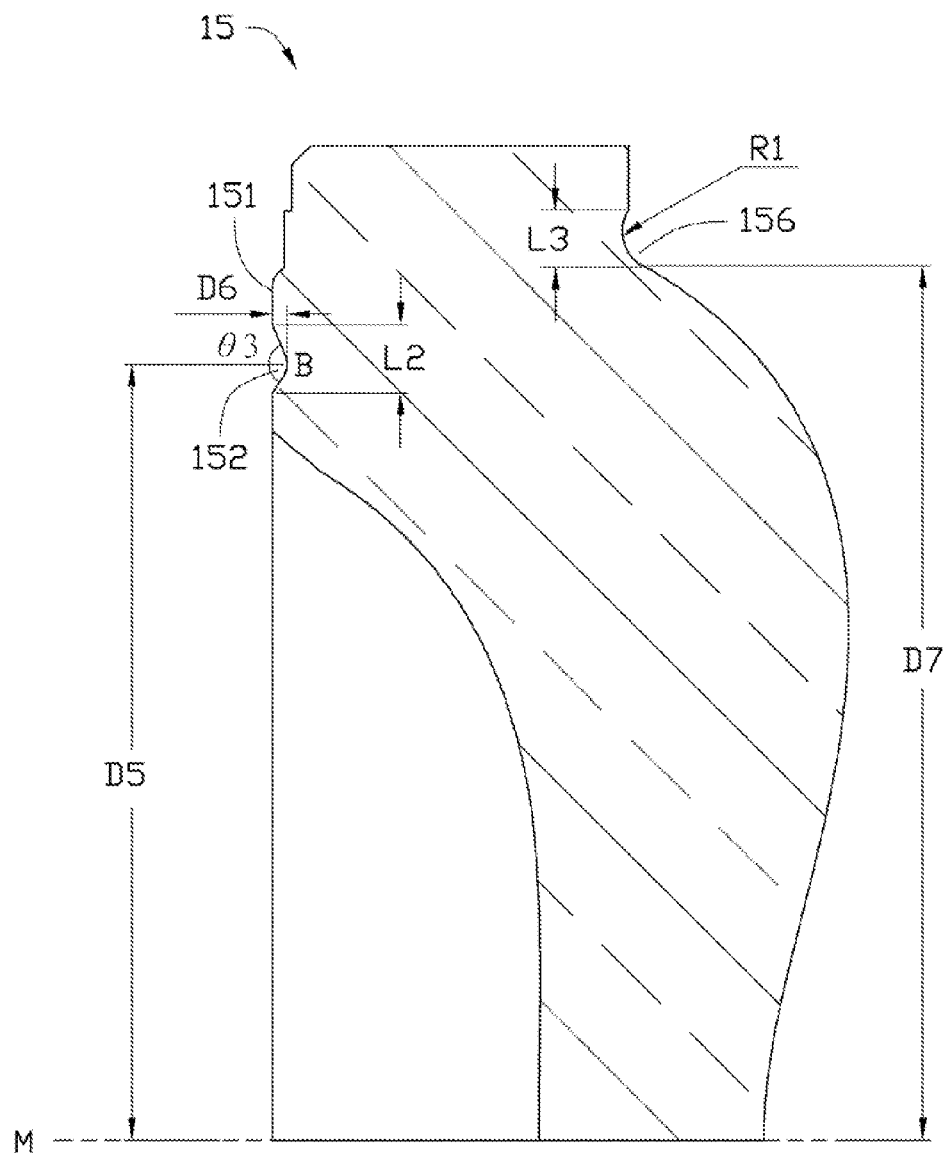
FIG. 3 is a schematic, cross-sectional view of half of the fifth lens of the lens module of FIG. 1.

Also referring to FIG. 3, the object-side surface of the fifth lens 15 has a fourth contact portion 151 abutting against the corresponding spacer 20. The fourth contact portion 151 defines a second notch 152. The second notch 152 has a triangular cross section in a direction parallel to the optical axis M of the lens module 100. The second notch 152 surrounds the optical portion of the fifth lens 15. The length of an opening of the second notch 152 along the direction perpendicular to the optical axis of the lens module 100 is L2, 0.1 mm$\leq$L2$\leq$0.5 mm, and thus 0.019$\leq$L2/D$\leq$0.094. The second notch 152 has an apex angle $\theta 3$ facing the corresponding spacer 20, 120°$\theta 3\leq$170°. The distance from the apex B of the second notch 152 to the optical axis of the lens module 100 is D5, 1.7 mm$\leq$D5$\leq$2.3 mm, 0.321$\leq$D5/D$\leq$0.434. The distance from the apex B of the second notch 152 to the fourth contact portion 151 is D6, that is, D6 is the depth of the second notch 152, 0.1 mm$\leq$D6$\leq$0.5 mm, and thus 0.019$\leq$D6/D$\leq$0.094. In one exemplary embodiment, L2 is about 0.15 mm, $\theta 3$ is about 124°, D5 is about 2 mm, D6 is about 0.18 mm.

The non-optical portion on the image-side surface of the fifth lens 15 has a spaced portion 150. The spaced portion 150 is adjacent to the optical portion of the fifth lens 15 and not in contact with the corresponding spacer 20. The spaced portion 150 defines a third notch 156. The third notch 156 has an arc-shaped cross section in a direction parallel to the optical axis M of the lens module 100. The third notch 156 surrounds the optical portion of the fifth lens 15. The radius of the third notch 156 is R1, 0.03 mm$\leq$R1$\leq$3 mm, and thus 0.006$\leq$R1/D$\leq$0.566. The length of the opening of the third notch 156 along a direction perpendicular to the optical axis of the lens module 100 is L3, 0.1 mm≦L3≦0.5 mm and thus 0.019≦L3/D≦0.094. The distance from the end of the third notch 156 adjacent to the optical portion to the optical axis of the lens module 100 is D7, 2 mm≦D7≦2.6 mm and thus 0.377≦D7/D≦0.491. In one exemplary embodiment, R1 is about 0.1 mm, L3 is about 0.15 mm, D7 is about 2.26 mm.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module comprising:
   a barrel having a semi-enclosed object end and an image end, the barrel defining a receiving space communicating between the object end and the image end;
   a first lens;
   a second lens; and
   a first spacer;
   wherein the first lens, the first spacer and the second lens are received in the receiving space in an order from an object side to an image side of the lens module, each of the first lens and the second lens comprises an optical portion and a non-optical portion around the optical portion, the first spacer is positioned between and contacts the non-optical portion of the first lens and the non-optical portion of the second lens, the second lens comprises an image-side surface, the non-optical portion on the image-side surface comprises a first contact portion contacting the first spacer, the first contact portion defines a first notch surrounding the optical portion of the second lens, the first notch has a triangular cross section in a direction parallel to an optical axis of the lens module.

2. The lens module of claim 1, wherein the first notch has an opening, a length of the opening is L1, the image end has an inner diameter D, 0.0377≦L1/D≦0.0943.

3. The lens module of claim 2, wherein the first notch has an apex angle θ1 facing the image end, 120°≦θ1≦170°.

4. The lens module of claim 3, wherein a distance from an apex of the apex angle θ1 to the optical axis of the lens module is D1, 0.189≦D1/D≦0.943, a depth of the first notch is D2, 0.002≦D2/D≦0.009.

5. The lens module of claim 2, wherein the lens module further comprises a third lens on an image side of the second lens, the non-optical portion of the second lens comprises a second contact portion, a third contact portion, and a connecting portion connecting between the second contact portion and the third contact portion, the second contact portion abuts against an inner sidewall of the barrel, the third contact portion abuts against the third lens, the connecting portion comprises an inclined surface, an included angle between the inclined surface and the optical axis of the lens module is θ2, 100°≦θ2≦160°.

6. The lens module of claim 5, wherein the inclined surface comprises a first end and a second end, the first end is positioned away from the optical axis of the lens module relative to the second end, a distance between the first end and the optical axis of the lens module is D3, 0.377≦D3/D≦0.472, a distance between the second end and the optical axis of the lens module is D4, 0.339≦D4/D≦0.453.

7. The lens module of claim 2, wherein the lens module comprises a third lens, a fourth lens, and a fifth lens, all of which are positioned on the image side of the second lens in an order from the object side to the image side of the lens module, the lens module further comprises a second spacer, a third spacer, a fourth spacer, each of the second, third and fourth spacers is positioned between each two adjacent lenses of the second, third, fourth and fifth lenses, the first contact portion contacts the second spacer, the fifth lens comprises an optical portion and a non-optical portion around the optical portion, the non-optical portion of the fifth lens comprises a fourth contact portion on an object-side surface of the fifth lens, the fourth contact portion abuts against the fourth spacer, the fourth contact portion defines a second notch surrounding the optical portion of the fifth lens, the second notch has a triangular cross section in a direction parallel to the optical axis of the lens module.

8. The lens module of claim 7, wherein the second notch has an opening, a length of the opening of the second notch along a direction perpendicular to the optical axis of the lens module is L2, 0.019≦L2/D≦0.094, the second notch comprises an apex angle θ3 facing the fourth spacer, 120°≦θ3≦170°, a distance from the apex of the apex angle to the optical axis of the lens module is D5, 0.321≦D5/D≦0.434, a depth of the second notch is D6, 0.019≦D6/D≦0.094.

9. The lens module of claim 7, wherein the lens module comprises a fifth spacer positioned on an image-side surface of the fifth lens, the non-optical portion on the image-side surface of the fifth lens has a spaced portion, the spaced portion is adjacent to the optical portion of the fifth lens and separates from the fifth spacer, the spaced portion defines an third notch surrounding the optical portion of the fifth lens, the third notch has an arc-shaped cross section in a direction parallel to the optical axis of the lens module.

10. The lens module of claim 9, wherein a radius of the third notch is R1, 0.006≦R1/D≦0.566, a length of the opening of the third notch along a direction perpendicular to the optical axis of the lens module is L3, 0.019≦L3/D≦0.094, a distance from an end of the third notch adjacent to the optical portion of the fifth lens to the optical axis of the lens module is D7, 2 mm≦D7≦2.6 mm.

* * * * *